Patented Nov. 17, 1925.

1,561,667

UNITED STATES PATENT OFFICE.

LOUIS F. SCHMELZER, OF CARTERET, NEW JERSEY.

PROCESS OF DIGESTING MATERIALS FOR MAKING FERTILIZERS AND STOCK FOODS.

No Drawing. Application filed October 30, 1922. Serial No. 598,029.

*To all whom it may concern:*

Be it known that LOUIS F. SCHMELZER, a citizen of the United States, and resident of Carteret, in the county of Middlesex and State of New Jersey, has invented certain new and useful Improvements in the Process of Digesting Materials for Making Fertilizers and Stock Foods, of which the following is a specification.

My invention relates to the making of fertilizers and food for stock.

The object of my invention is to provide a new and improved process for preparing materials containing protein and other food and fertilizer elements or compounds for use as stock foods or fertilizer respectively.

A further object is to digest animal, vegetable and waste material containing nitrogen (proteins) at a lower cost than that heretofore attainable and to dry same without dehydrating below a predetermined degree, to obtain a maximum yield of the desired materials.

Among the materials to be treated by my process may be mentioned animal hair, wool, leather, waste, garbage, etc., for fertilizer purposes, and slaughter house materials such as flesh, hides, etc., for stock food.

The novel part of my process is carried out by placing the materials to be treated in a steam tight container which is preferably heated by steam under pressure, the temperature of which can be controlled.

To illustrate my process I will describe the treatment of hair or wool, which in the raw condition contain usually a high percentage of moisture.

I place in the tank or container one ton of the material and heat the container until the greater part of the surplus water contained therein is driven off at a temperature just above the boiling point, after which the container is closed steam tight and the steam heating the container is raised in pressure to 100 lbs. or more by gauge, and as the moisture is driven from the materials and exceeds the predetermined pressure at which the process is to be carried out, the surplus steam is exhausted from the container by the automatic action of a relief valve mounted on the container, or by opening a relief valve manually from time to time to maintain the steam within the container at the desired pressure, the steam being kept moist at all times to prevent excessive hydrolysis, and also to prevent burning the materials being treated. After the water content of the material has been reduced to about 10 percent of moisture, the external heat is removed and the steam in the container is released and the container closed when the gauge registers no pressure after which the remaining steam is condensed which causes a partial vacuum to be formed under the action of which a further amount of moisture is eliminated from the material and reduces it to about 6 per cent which is the desired amount.

The material is then removed from the container and crushed or ground to comminute the mass.

It will be observed that at no time is there any water or fluid added to the material in the tank but that the same is digested in moist steam derived from the material itself, and that the last step of condensing the steam to reduce the pressure in the tank below that of the atmosphere to extract the last amount of moisture from the material, results in a direct saving of fuel, and also a saving is effected by obtaining all the steam used in the tank from the moisture contained in the material treated. During the treatment of some materials it is often found advantageous to agitate the mass during the process, which may be done in any convenient manner known to the arts, as it results in a saving in the time required to digest the mass, reduces the cost to a further degree and results in a more uniform product.

The other materials above referred to are treated in the same manner as herein described to provide a product suitable for the purposes described.

In the treatment of garbage, which is often received in a very wet condition, I prefer to first pass it through a press or other equivalent treatment to expel the free water content before placing it in the tank for treatment by my process.

Having thus described my process I claim as new:

1. The process of preparing materials containing nitrogen compounds or proteins, for fertilizer or stock food purposes, consisting in digesting the material in a closed steam tight container subjected to heat, in steam derived substantially entirely from moisture contained in said material.

2. The process of preparing materials containing nitrogen compounds or proteins, for fertilizer or stock food purposes, consisting in digesting the materials in a closed steam tight container subjected to heat, in moist steam derived substantially entirely from the moisture contained in said materials.

3. The process of preparing materials containing nitrogen compounds or proteins, for fertilizer or stock food purposes, consisting in digesting the material in a closed steam tight container subjected to heat, in steam derived substantially entirely from moisture contained in said material, the excess steam generated in the container being released when it exceeds the predetermined pressure at which the material is to be digested, continuing the digesting process until the material contains less than 12 per cent of moisture, then causing the steam in the container to be condensed to provide a pressure below that of the atmosphere to extract a further amount of moisture from the material before opening the container to the atmosphere.

4. The process of preparing materials containing nitrogen compounds or proteins, for fertilizer or stock food purposes, consisting in digesting the materials in a closed steam tight container subjected to heat, in moist steam derived substantially entirely from the moisture contained in said materials, releasing the steam after digestion is completed, reducing the pressure of steam in the container below that of the atmosphere to cause the removal of a further amount of moisture from the materials treated.

Signed at New York city, in the county of New York and State of New York this 19th day of October, 1922.

LOUIS F. SCHMELZER.